United States Patent [19]

Nissborg

[11] Patent Number: 5,023,441

[45] Date of Patent: Jun. 11, 1991

[54] METHOD TO MEASURE THE ANGLE OF INCIDENCE FOR RADIATION AND A DETECTOR TO CARRY OUT THE METHOD

[75] Inventor: Kurt Nissborg, Skänninge, Sweden

[73] Assignee: Forsvarets Forskningsanstalt, Stockholm, Sweden

[21] Appl. No.: 392,531

[22] PCT Filed: Nov. 25, 1988

[86] PCT No.: PCT/SE88/00647

§ 371 Date: Jul. 20, 1989

§ 102(e) Date: Jul. 20, 1989

[87] PCT Pub. No.: WO89/04973

PCT Pub. Date: Jun. 1, 1989

[30] Foreign Application Priority Data

Nov. 27, 1987 [SE] Sweden .............................. 8704740

[51] Int. Cl.$^5$ ............................................. H01J 40/14
[52] U.S. Cl. ............................. 250/206.2; 250/208.6
[58] Field of Search ............... 250/206.2, 206.1; 203.3, 250/203.4, 203.6, 208.2, 208.6; 356/141, 152

[56] References Cited

U.S. PATENT DOCUMENTS 3,229,102  1/1966  Spencer et al. .

3,992,099 11/1976 Laughlin ..................... 250/206.1

Primary Examiner—David C. Nelms
Attorney, Agent, or Firm—Fleit, Jacobson, Cohn, Price, Holman & Stern

[57] ABSTRACT

The present invention relates to a method to measure the angle of incidence for radiation and a detector to carry out the method. The background for the invention is that in certain electromagnetic radiation, for example laser light of different wavelengths from UV to IR, there occurs an irregularity, speckledness, that is among other things caused by turbulence in the atmosphere. This phenomenon gives rise to problems during the registration of a single or a few short pulses of radiation. Difficulties to reliably determine the angle to the source of radiation with high resolution can arise. This problem is solved by the invention by mounting two detector elements (1,2) so close to each other that both detector elements receive essentially the same irradiance and in such a direction that the normals of respective detector element form a known angle ($\beta$) with each other. One then calculates the angle of incidence ($\alpha$) by means of the signals ($S_1, S_2$) from the detector elements (1,2), that depend on the shape of the sensitivity beams, and said angle ($\beta$) between the detector elements.

6 Claims, 1 Drawing Sheet

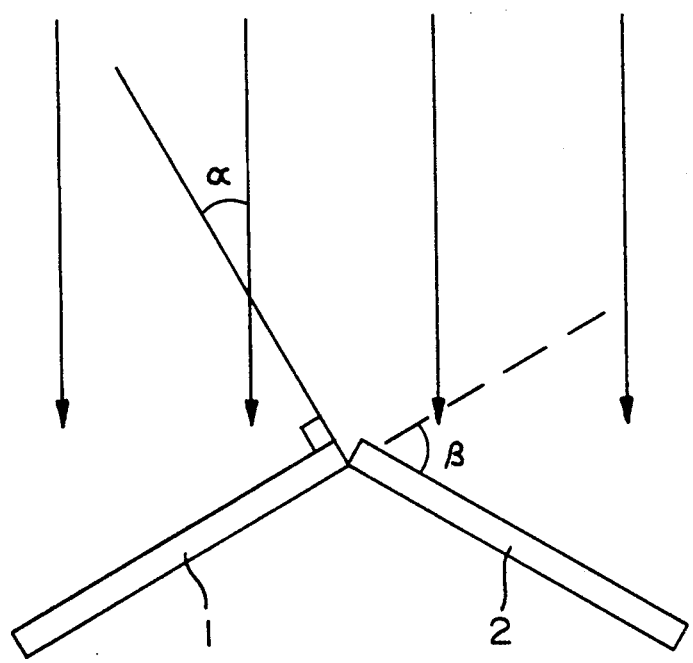

METHOD TO MEASURE THE ANGLE OF INCIDENCE FOR RADIATION AND A DETECTOR TO CARRY OUT THE METHOD

BACKGROUND OF THE INVENTION

The present invention relates to a method for measuring the angle of incidence for radiation and a detector for carrying out the method. The background for the invention is that in certain electromagnetic radiation, for example laser light of different wavelengths from UV to IR, there occurs an irregularity, speckledness, that is among other things caused by turbulence in the atmosphere. The speckledness varies with a frequency of up to 100 Hz. Experiments that have been carried out have shown that this phenomenon, that means a great variation in the irradiance of the radiation that falls onto a detector, gives rise to problems during the registration of a single or a few short pulses of radiation. On one hand the probability of detection can decrease considerably and on the other hand difficulties of reliably determining the angle to the source of radiation with high resolution can arise.

SUMMARY OF THE INVENTION

The latter problem is solved by the invention by giving it the design that is evident from the following claims.

BRIEF DESCRIPTION OF THE DRAWING

In the following, the invention will be described in more detail with reference to the accompanying drawing that shows a detector sensitive to the angle of incidence in accordance with the invention.

DETAILED DESCRIPTION OF THE PREFERRED EMBODIMENT

The basis for the idea of the invention is that one places two detector elements 1,2 with their detector planes in a certain angle to each other and so close to each other that the correlation between the irradiance of the radiation towards them is high. Both detector elements measure towards the same speckle in the speckled radiation.

The correlation between the irradiance detected by the detector elements 1,2 depends on the mounting distance between the two detector elements. The wavelength, the illumination distance and the atmospheric condition also play a part here. As an example the irradiances are completely uncorrelated if the detector elements 1,2 are mounted at a distance of more than about 5 cm, if the wavelength is 1 µm and the illumination distance is 2000 m. (This is calculated from $\sqrt{\lambda \cdot L}$, $\lambda =$ the wavelength and $L =$ the illumination distance). When the distance is about 4 mm the correlation between the signals from the detector elements are about 0.9, which is a minimum value if one is to get useful results by the invention. The example is valid for a moderately turbulent atmosphere.

As one tries to get a small average distance between the two detector elements 1,2 it can be suitable to use rectangular or in another way oblong detector elements that are placed with the long sides against each other. From the point of view of correlation it is better the closer the elements are placed. Experiments have been carried out at 1 µm with detector elements having the measures 0.6×2.5 mm, which for reasons of manufacturing technique were placed with the long sides about 1.4 mm apart.

The detector elements 1,2 can be of a completely conventional type, chosen according to the wave length and pulse length of the radiation to be detected. The signal caused by the radiation from each detector element depends on the angle of incidence of the radiation. Each detector has a sensitivity beam, within which the sensitivity for incident radiation varies in a way specific for each detector type. With knowledge of the shape of the sensitivity beams for the detector elements used, the direction of the incident radiation can be referred to a desired reference direction by an angle $\alpha$ by means of a suitable signal processing. If, for example, one uses a conventional detector of the type that has a sensitivity beam having essentially a cosinusoidal dependence of the angle of incidence, the signal $S_1, S_2$ from each detector element arising from the radiation will depend upon the angle of incidence for the radiation according to the cosine law.

The cosine law gives:
$S_1 = E \cos \alpha$ $S_2 = E \cos (\beta - \alpha)$ where
$S_1 =$ The signal from detector element 1,
$S_2 =$ The signal from detector element 2,
$E =$ the power density (W/m$^2$) of the incident radiation
$\alpha =$ the angle sought for $=$ the angle with the normal of the detector plane 1,
$\beta =$ the known angle between the detector planes. If one solves with respect to $\alpha$ one gets $$\alpha = \arctan \frac{S_2/S_1 - \cos \beta}{\sin \beta}.$$

Thus it is easy to calculate the angle of incidence for the radiation in relation to a given reference direction.

I claim:

1. A method for measuring an angle of incidence for short pulses of speckled radiation, caused by a turbulent atmosphere, in relation to a reference direction, comprising the steps of:
   mounting two detector elements so each detector element receives essentially the same irradiance and in such a direction that the normals of each respective detector element form a known angle with each other; and
   calculating the angle of incidence using signals from the detector elements, depending on the shape of the sensitivity beams, and said known angle between the detector elements.

2. A method according to claim 1 wherein mounting the detector elements in said mounting step is performed so the correlation between their respective measured irradiance is greater than 0.9.

3. A method according to claim 1 further comprising the steps of:
   choosing rectangular detector elements; and
   mounting the detector elements with their long sides against each other giving a small average distance between them.

4. A detector for measuring the angle of incidence for short pulses of speckled radiation caused by a turbulent atmosphere in relation to a reference direction comprising:

a first detector element; and a second detector element mounted to said first detector element so said first and second detector elements receive essentially the same irradiance and are orientated to have the normals of each respective detector element form a known angle with each other, wherein the angle of incidence can be calculated by means of signals from the first and second detector elements, that depend on the shape of the sensitivity beams, and said known angle between the first and second detector elements.

5. A detector according to claim 4 wherein the first and second detector elements are mounted so the correlation between their respective measured irradiance is greater than 0.9.

6. A detector according to claim 4 wherein the first and second detector elements are rectangular and mounted with their long sides against each other to give a small average distance between them.

* * * * *